(12) United States Patent
Kobara

(10) Patent No.: US 7,904,422 B2
(45) Date of Patent: Mar. 8, 2011

(54) SYSTEM FOR DEPLOYING DATA FROM DEPLOYMENT-SOURCE DEVICE TO DEPLOYMENT-DESTINATION DEVICE

(75) Inventor: Makoto Kobara, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 547 days.

(21) Appl. No.: 12/048,942

(22) Filed: Mar. 14, 2008

(65) Prior Publication Data

US 2008/0228808 A1 Sep. 18, 2008

(30) Foreign Application Priority Data

Mar. 15, 2007 (JP) ................................. 2007-067333

(51) Int. Cl.
*G06F 7/00* (2006.01)
(52) U.S. Cl. ......... 707/624; 707/625; 707/634; 707/637; 707/660; 707/698
(58) Field of Classification Search .................. None
See application file for complete search history.

(56) References Cited

U.S. PATENT DOCUMENTS

2003/0120932 A1* 6/2003 Epstein ................... 713/181
2006/0130037 A1* 6/2006 Mackay ................... 717/168

FOREIGN PATENT DOCUMENTS

| JP | 2006-48529 A | 2/2006 |
|---|---|---|
| JP | 2006-508458 | 3/2006 |
| JP | 2006-172472 | 6/2006 |
| JP | 2006-268740 | 10/2006 |
| JP | 2006-343830 A | 12/2006 |

OTHER PUBLICATIONS

Final Notice of Rejection mailed Apr. 14, 2009, issued by the Japanese Patent Office in JPO Patent Application No. 2007-067333, 5 pages.
Notice of Reasons for Rejection mailed Jan. 7, 2009, issued by the Japanese Patent Office in JPO Patent Application No. 2007-067333, 4 pages.

* cited by examiner

*Primary Examiner* — Tim T. Vo
*Assistant Examiner* — Anh Tai V Tran
(74) *Attorney, Agent, or Firm* — Finnegan, Henderson, Farabow, Garrett & Dunner, L.L.P.

(57) ABSTRACT

An identifier generation unit generates first identifiers corresponding to a plurality of first fragmentary data, into which first data that is stored in a database is divided. A database stores the first data and the first identifiers. The identifier generation unit generates, when the first data is updated to second data, second identifiers corresponding to a plurality of second fragmentary data into which the second data is divided. A deployment control unit determines whether the first identifiers are identical to the second identifiers which correspond to the first identifiers. The deployment control unit writes in the database the second fragmentary data corresponding to the second identifiers and the second identifiers when it is determined that the first identifiers are not identical to the second identifiers which correspond to the first identifiers.

9 Claims, 11 Drawing Sheets

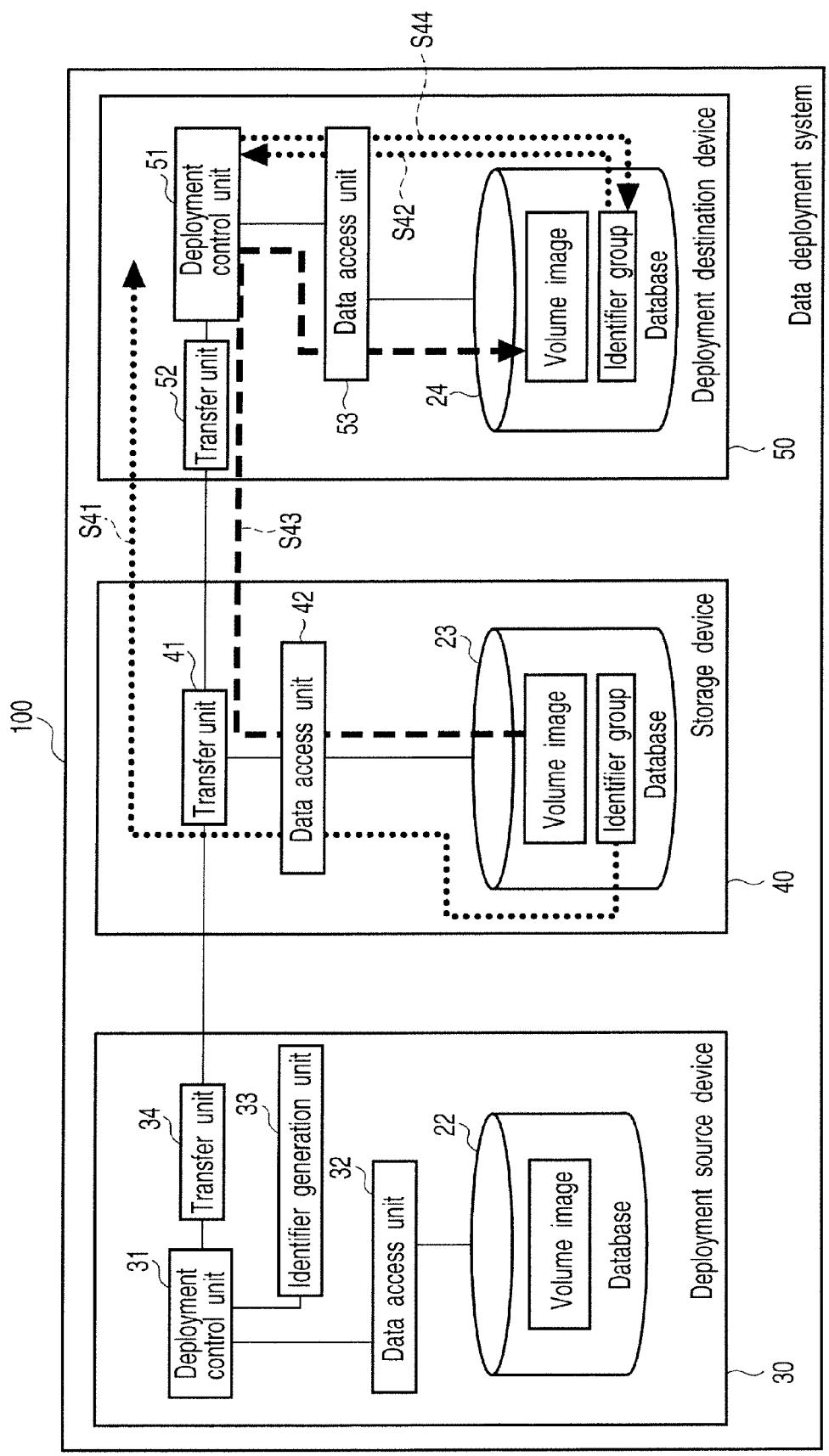
F I G. 8

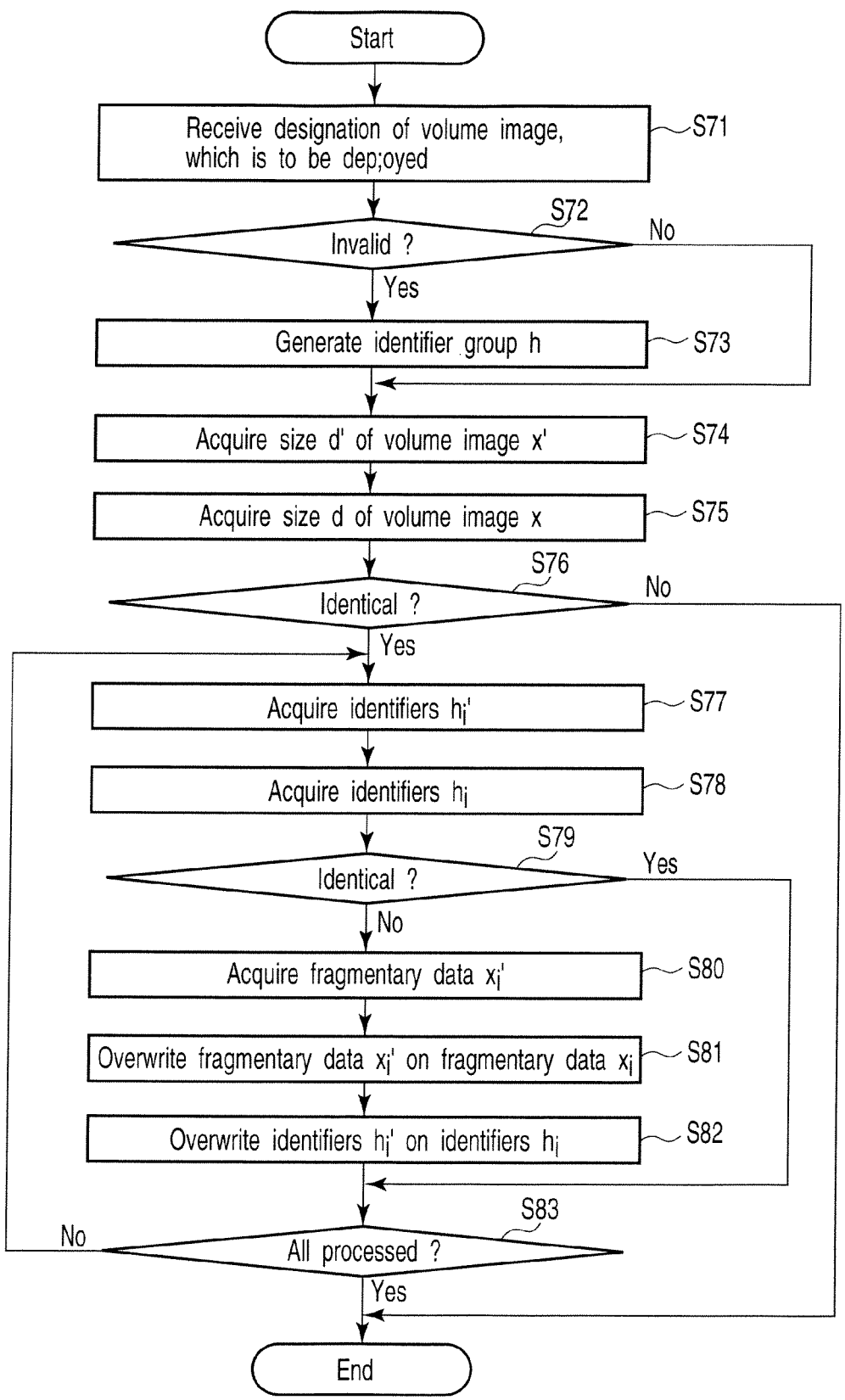
F I G. 12

SYSTEM FOR DEPLOYING DATA FROM DEPLOYMENT-SOURCE DEVICE TO DEPLOYMENT-DESTINATION DEVICE

CROSS-REFERENCE TO RELATED APPLICATIONS

This application is based upon and claims the benefit of priority from prior Japanese Patent Application No. 2007-067333, filed Mar. 15, 2007, the entire contents of which are incorporated herein by reference.

BACKGROUND OF THE INVENTION

1. Field of the Invention

The present invention relates generally to a data deployment system for deploying data from a deployment-source device to a deployment-destination device, and more particularly to deployment of a differential part that is an updated part of data.

2. Description of the Related Art

In recent years, there has been proposed a method for taking countermeasures against leaks or security incidents such as theft or loss of information devices that are taken out of, for instance, companies. In this method, a pre-confirmed or a pre-authorized deployed (copy) image is used as a disk volume image including, e.g. an OS (Operating System) and an application. According to this method, data which is created or saved outside a company is erased if the information device is powered off. Data, which requires to be saved, is transferred to the company over a network and is saved, or is saved by using a method such as a secret sharing scheme.

As a technique of deploying (copying) such a volume image from the deployment-source to the deployment-destination, use can be made of a deployment method for uniformizing system images of many PCs (Personal Computers), for example, in a computer training room of a school or in a call center.

For example, a deployment-source device reads in a volume image which is stored in a database (e.g. a storage medium such an HDD) that is included in this deployment-source device, and transfers the volume image to the deployment-destination device via a communication network. In the deployment-destination device, the transferred volume image is written in a database of the deployment-destination device. The deployment-source device is an information processing device which creates a disk volume image (master image) which is to be deployed. On the other hand, the deployment-destination device is an information processing device to which, for example, the disk volume image that is created by the deployment-source device is deployed.

Now assume the case in which the volume image that is stored in the database of the deployment-source device has been updated. Even in this case, the entirety of the volume image is transferred to the deployment-destination device, for example, regardless of the presence/absence of update of each of blocks (divisional fragmentary parts of the volume image) that constitute the volume image. Since even a non-updated one of the blocks that constitute the volume image, for instance, is also transferred, the speed of the deployment process decreases.

To cope with this problem, a differential transfer technique is known, which is a technique of executing the deployment process at a higher speed by executing a process relating to only the updated block. An example of the differential transfer technique is a technique (hereinafter referred to as "first technique") of detecting an updated block by making use of an update map relating to each of the blocks that constitute the volume image.

Another example of the differential transfer technique is a technique (hereinafter referred to as "second technique") of detecting an updated block by comparing identifiers, such as hash values, of data of each of the blocks constituting the volume image, at the transfer (deployment) source or destination. In the second technique, identifiers of fragments (blocks) of the current volume images (the volume images currently stored in the database of the deployment-source device and the database of the deployment-destination device) are generated in the deployment-source device and the deployment-destination device. For example, the volume image is read in units of sectors of a fixed size, and the associated hash value is generated. For example, in the deployment-source device, the corresponding hash values (identifiers) are compared, and the data of the sector, with respect to which the corresponding hash values are different, is transferred to the deployment-destination device, and the corresponding data is overwritten. According to the second technique, the updated part (hereinafter referred to as "differential part") of the volume images stored in the deployment-source device and deployment-destination device can be detected on the basis of the difference between the identifiers.

By the above-described differential transfer technique, in the case where the volume in the deployment-source device has been updated, it is possible to realize the transfer of only the differential part without the transfer of the entirety of the volume image.

As regards the above-described differential transfer technique, a technique, which is suited to reduction in time that is needed for replication, is disclosed (see Jpn. Pat. Appln. KOKAI Publication No. 2006-268740). According to this technique, a backup medium is transferred to a replication destination, backup is executed from a backup device, and only differential data is copied.

In the differential transfer technique, like the above-described first technique, however, in a case where a plurality of transfer-destination PCs (deployment-destination devices) are present and the transfer-destination PCs have a plurality of volume images of different versions, it is necessary to manage a differential map in accordance with each version. In addition, if a differential map of an arbitrary version is missing, it is absolutely impossible to recover volume images of the versions which follow the missing version. In this case, since a differential part of the volume image that is updated in the deployment-source device cannot be transferred, the deployment-destination device needs to read in the entirety of the volume image that is deployed. Moreover, since a differential part cannot be transferred if the differential map is missing, it is not possible to easily discard (erase), for instance, even the differential map of the old version.

On the other hand, the differential transfer technique, like the above-described second technique, requires the identifiers of the volume images of the transfer source (deployment-source) and transfer destination (deployment-destination) at the time point of, for example, starting deployment. Thus, at the time point of starting deployment, it is necessary to read in the entirety of the volume image in each of the transfer source and transfer destination and to execute a process of generating the identifiers of the volume images. At this time, for example, if the speed of access to the communication path is sufficiently higher than the speed of access to the database of the deployment-source device or deployment-destination device, the process of reading in the entirety of the volume image results in a bottleneck. As a result, the advantageous effect of the increase in speed of the deployment process by the differential transfer decreases.

BRIEF SUMMARY OF THE INVENTION

The object of the present invention is to provide a data deployment system and a data deployment program, which can deploy data at high speed by deploying a differential part of updated data, which is stored in a deployment-source device, to a deployment-destination device.

According to an aspect of the present invention, there is provided a data deployment system comprising: a deployment-source device including a first database which stores first data; and a deployment-destination device to which the first data stored in the first database is deployed, the deployment-source device including: a first generation unit which generates first identifiers corresponding to a plurality of first fragmentary data, into which the first data stored in the first database is divided; and a second generation unit which generates, in a case where the first data is updated to second data, second identifiers corresponding to a plurality of second fragmentary data, into which the second data is divided, and the deployment-destination device including: a second database which stores the first data that is stored in the first database and the first identifiers that are generated by the first generation unit; a determination unit which determines whether the first identifiers stored in the second database are identical to the second identifiers which correspond to the first identifiers and are generated by the second generation unit; and a write unit which writes in the second database the second fragmentary data corresponding to the second identifiers and the second identifiers in a case where the determination unit determines that the first identifiers are not identical with the second identifiers which correspond to the first identifiers.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a view for explaining an operation in which the deployment-destination device 50 executes differential downloading of a volume image from the storage device 40;

FIG. 12 is a flow chart illustrating a process procedure of differential downloading in a case where an identifier group corresponding to a volume image stored in the database 24 is invalidated.

DETAILED DESCRIPTION OF THE INVENTION

An embodiment of the present invention will now be described with reference to the accompanying drawings.

Figure 1:
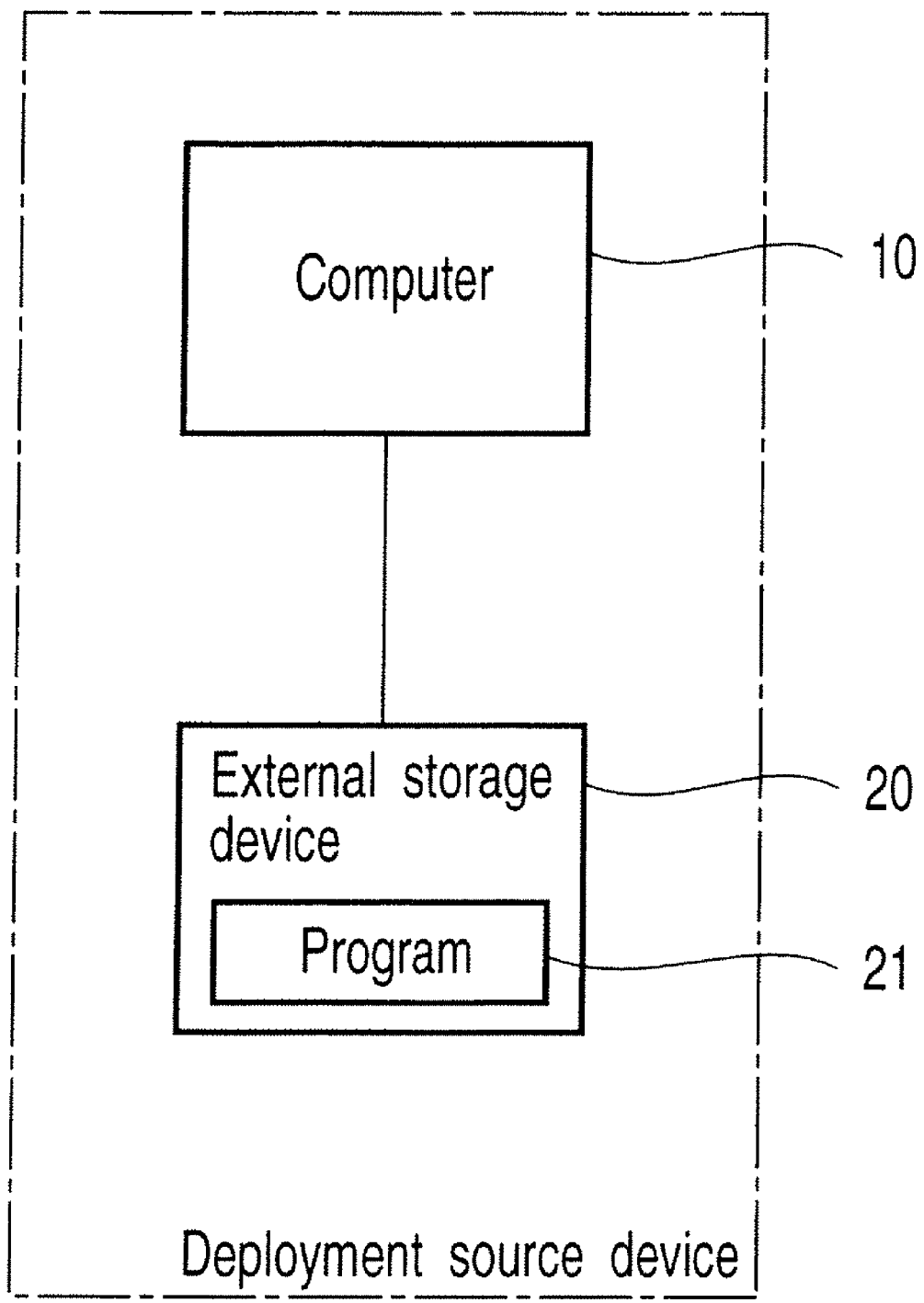
FIG. 1 is a block diagram showing a typical hardware configuration of a deployment-source device, a deployment-destination device or, and a storage device, which constitutes a data deployment system according to an embodiment of the present invention.

FIG. 1 is a block diagram showing a hardware configuration of a deployment-source device, a deployment-destination device, and a storage device, which constitutes a data deployment system according to the embodiment of the invention. Although FIG. 1 shows the deployment-source device by way of example, the deployment-destination device and storage device have the same structure. In the description below, the structures of the deployment-destination device and storage device will also be described with reference to FIG. 1.

As shown in FIG. 1, a computer 10 is connected to an external storage device 20 such as a hard disk drive (HDD). The external storage device 20 stores a program 21 which is executed by the computer 10. The computer 10 and external storage device 20 constitute a deployment-source device 30.

Figure 2:
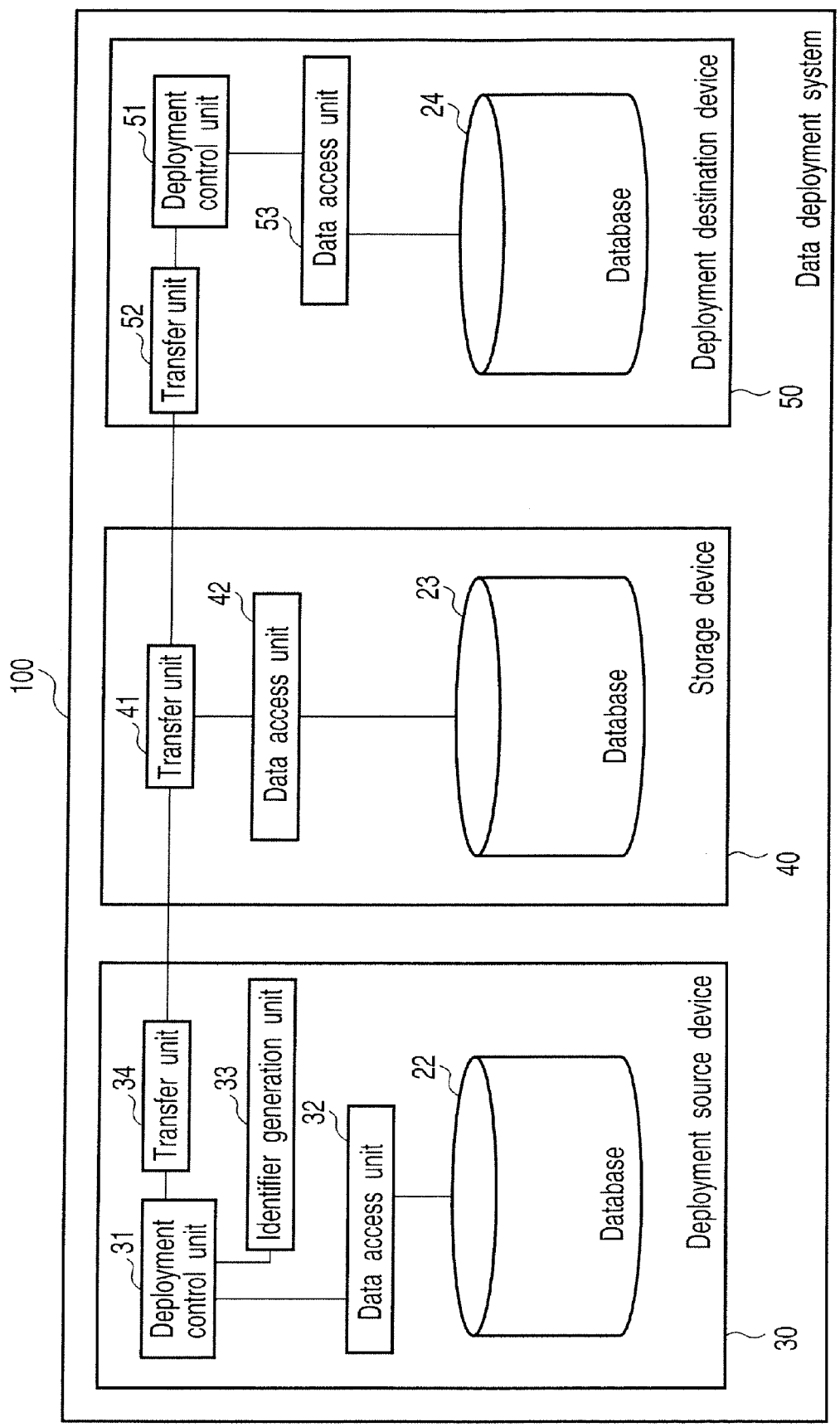
FIG. 2 is a block diagram which mainly shows a functional configuration of the data deployment system according to the embodiment.

FIG. 2 is a block diagram which mainly shows a functional configuration of the data deployment system according to the embodiment. The data deployment system 100 comprises the deployment-source device 30, a storage device 40 and a deployment-destination device 50. The deployment-source device 30 and the storage device 40 are connected to be communicable via, for example, a communication path. Similarly, the storage device 40 and the deployment-destination device 50 are connected to be communicable via, for example, a communication path. In the data deployment system 100, the deployment-source device 30 uploads a disk volume image (volume image), which includes, e.g. an operating system (OS) and an application, into the storage device 40. The deployment-destination device 50 downloads the volume image, which is uploaded by the deployment-source device 30, from the storage device 40. Thereby, the deployment-source device 30 deploys the volume image to the deployment-destination device 50.

The deployment-source device 30 includes a deployment control unit 31, a data access unit 32, an identifier generation unit 33 and a transfer unit 34. In the present embodiment, it is assumed that the units 31 to 34 are respectively realized by the execution of the program 21 stored in the external storage device 20 by the computer 10 shown in FIG. 1. The program 21 may be prestored in a computer-readable memory medium and may be distributable. This program 21 may be downloaded in the computer 10, for example, via a network.

The deployment-source device 30 includes a database 22. In the present embodiment, the database 22 is stored in the external storage device 20.

The database 22 is a memory medium such as an HDD, and stores the above-described volume image. The database 22 has, for example, a memory capacity that is sufficient to store the volume image.

The deployment control unit 31 receives, from an upper-level application, for instance, an instruction for upload of a volume image which is designated by, e.g. an administrator of the data deployment system 100. The deployment control unit 31 reads in a plurality of fragmentary data (constituting the volume image), into which the volume image designated by, e.g. the administrator is divided, via the data access unit 32. The fragmentary data are data of the volume image, which are read in units of sectors of fixed length, and the fragmentary data are set at intervals of, e.g. arbitrary logical block addresses (LBA). The deployment control unit 31 transmits the plural read-in fragmentary data (volume image) and an identifier group (to be described later), which is generated by the identifier generation unit 33, to the storage device 40 via the transfer unit 34.

The data access unit 32 provides the deployment control unit 31 with an access function of, e.g. data read/write from/to the database 22. An example of the access function is a small computer system interface (SCSI).

The identifier generation unit 33 generates, for instance, identifiers (first identifiers) corresponding to the plural fragmentary data (first fragmentary data) into which the volume image that is read in by the deployment control unit 31 is divided. The identifier generation unit 33 generates, as the identifiers corresponding to the plural fragmentary data, hash values of the plural fragmentary data by using a hash function such as MD5 or SHA-1. The identifier generation unit 33 outputs the generated identifiers (hash values) to the deployment control unit 31. A group of identifiers corresponding to plural fragmentary data, into which one volume image is divided, is referred to as "identifier group".

The transfer unit 34 transfers (read/write) to the storage device 40 the volume image (i.e. fragmentary data constituting the volume image) that is read in by the deployment control unit 31 and the identifier group that is generated by the identifier generation unit 33. An example of a usable communication method is an Internet small computer system interface (iSCSI).

The storage device 40 includes a transfer unit 41 and a data access unit 42. In the present embodiment, it is assumed that the units 41 and 42 are respectively realized by the execution of the program 21 stored in the external storage device 20 by the computer 10.

The storage device 40 includes a database 23. In the present embodiment, the database 23 is stored in the external storage device 20.

The database 23 stores, for instance, the volume image and the identifier group, which are sent from the deployment-source device 30. The database 23 has, for example, a memory capacity that is sufficient to store the volume image and identifier group. In a possible method of storing the volume image and identifier group, a partition in which the volume image is stored is set as a boot partition, and a partition in which the identifier group is stored is made inaccessible from the OS that is stored in the boot partition.

The transfer unit 41 writes the volume image and identifier group, which are sent from the deployment-source device 30, into the database 23 via the data access unit 42. In addition, for example, in response to a deployment request from the deployment-destination device 50 which requests deployment of the volume image, the transfer unit 41 reads in the volume image or identifier group, which is stored in the database 23, via the data access unit 42. The transfer unit 41 transmits the read-in volume image or identifier group to the deployment-destination device 50.

The data access unit 42 provides the transfer unit 41 with an access function of, e.g. data read/write from/to the database 23. Like the above-described data access unit 32, an example of the access function is SCSI.

The deployment-destination device 50 includes a deployment control unit 51, a transfer unit 52 and a data access unit 53. In the present embodiment, it is assumed that the units 51 to 53 are respectively realized by the execution of the program 21 stored in the external storage device 20 by the computer 10 shown in FIG. 1.

The deployment-destination device 50 includes a database 24. In the present embodiment, the database 24 is stored in the external storage device 20.

The database 24 stores, for instance, the volume image and the identifier group, which are sent (transferred) from the storage device 40. The database 24 has, for example, a memory capacity that is sufficient to store the volume image and identifier group. Like the above-described database 23, in a possible method of storing the volume image and identifier group, a partition in which the volume image is stored is set as a boot partition, and a partition in which the identifier group is stored is made inaccessible from the OS that is stored in the boot partition.

The deployment control unit 51 receives, from an upper-level application, for instance, an instruction for download of a volume image which is designated by, e.g. an administrator of the data deployment system 100. Upon receiving the instruction for download, the deployment control unit 51 sends a request for deployment of the volume image, which is designated by, e.g. the administrator, to the storage device 40 via the transfer unit 52.

The deployment control unit 51 writes the volume image or identifier group, which is transmitted from the storage device 40, into the database 24 via the data access unit 53.

In addition, the deployment control unit 51 compares identifiers (first identifiers) stored in the database 24 and identifiers (second identifiers) that are sent from the storage device 40. Thereby, the deployment control unit 51 determines whether one of the first identifiers stored in the database 24 equal to a corresponding one of the second identifiers that are sent from the storage device 40. If the deployment control unit 51 determines that at least one of the first identifiers stored in the database 24 does not equal to a corresponding second identifier sent from the storage device 40, the deployment control unit 51 acquires from the storage device 30 the fragmentary data (hereinafter referred to as "differential data") corresponding to the second identifier which does not equal to the first identifier. The deployment control unit 51 stores the acquired differential data in the database 24.

The data access unit 53 provides the deployment control unit 51 with an access function of, e.g. data read/write from/to the database 24. Like the above-described data access units 32 and 42, an example of the access function is SCSI.

Figure 3:
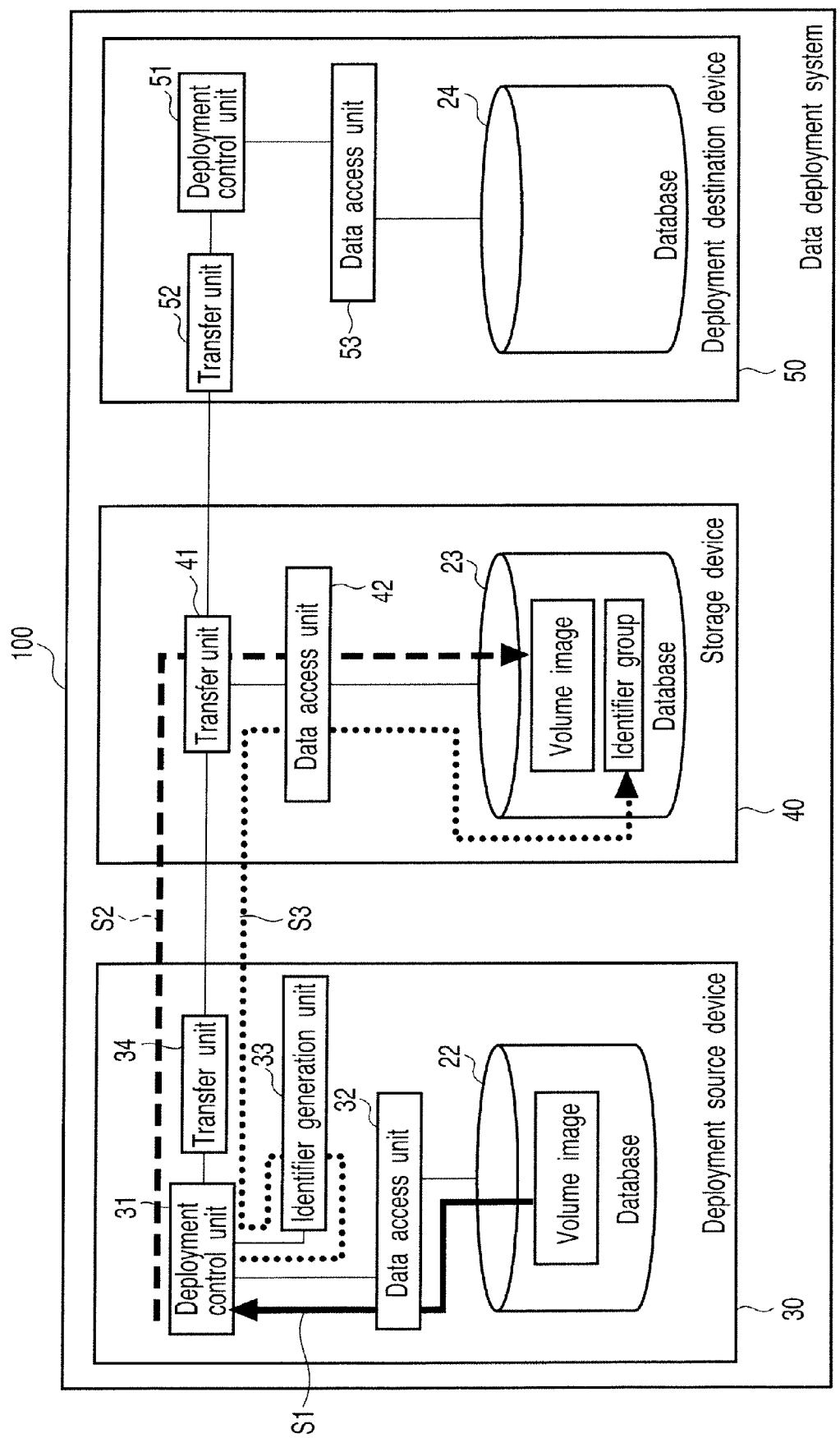
FIG. 3 is a view for explaining an operation in which a deployment-source device 30 uploads a volume image, which is stored in a database 22, into a storage device 40.

Next, referring to FIG. 3, a description is given of an operation in which the deployment-source device 30 uploads a volume image, which is stored in the database 22, into the storage device 40.

In general terms, the upload process comprises processes of steps S1 to S3, which are described below. To start with, the deployment control unit 31 of the deployment-source device 30 reads in a plurality of fragmentary data (e.g. 64 KB unit), into which a volume image that is designated for upload by, e.g. administrator is divided, from the database 22 via the data access unit 32 (step S1). The deployment control unit 31 successively reads in the plural fragmentary data into which the designated volume image is divided.

The deployment control unit 31 sends the read-in fragmentary data to the storage device 40 via the transfer unit 34. In the storage device 40, the fragmentary data that are sent from the deployment-source device 30 (deployment control unit 31) are written in the database 23 (step S2).

The identifier generation unit 33 of the deployment-source device 30 generates identifiers corresponding to the respective fragmentary data that are read in by the deployment control unit 31. The deployment control unit 31 transmits the identifiers, which are generated by the identifier generation unit 33, to the storage device 40 via the transfer unit 34. In the storage device 40, the identifiers that are transmitted from the deployment-source device 30 are written in the database 23 (step S3).

The identifiers and the fragmentary data used for the generation of the identifiers, which are sent to the storage device 40, are mutually associated and stored in the database 23.

The upload process is completed when the plural fragmentary data, into which the volume image that is designated for upload is divided, and the identifiers corresponding to the plural fragmentary data are all written in the database 23 of the storage device 40.

During the upload process, it is necessary to prevent the data from being written in the volume image (i.e. the area in which the volume image is stored) that is designated for upload. Thus, the upload process is executed, for example, in the following environment:
1) Boot is not executed from the designated volume image itself (boot is executed from another boot image), and
2) Writing of data is blocked (suppressed) by the driver level (filter driver) in a case where boot is executed from the volume image itself.

The above-described upload process may be configured to be executed, for example, each time the volume image stored in the database 22 of the deployment-source device 30 is updated (e.g. version upgrade of the OS or application, or update of pattern files of antivirus software). Besides, the upload process may be executed at predetermined time intervals which are set by, e.g. the administrator (e.g. every day, every month, etc.). These settings may be changed by, e.g. the administrator.

Figure 4:
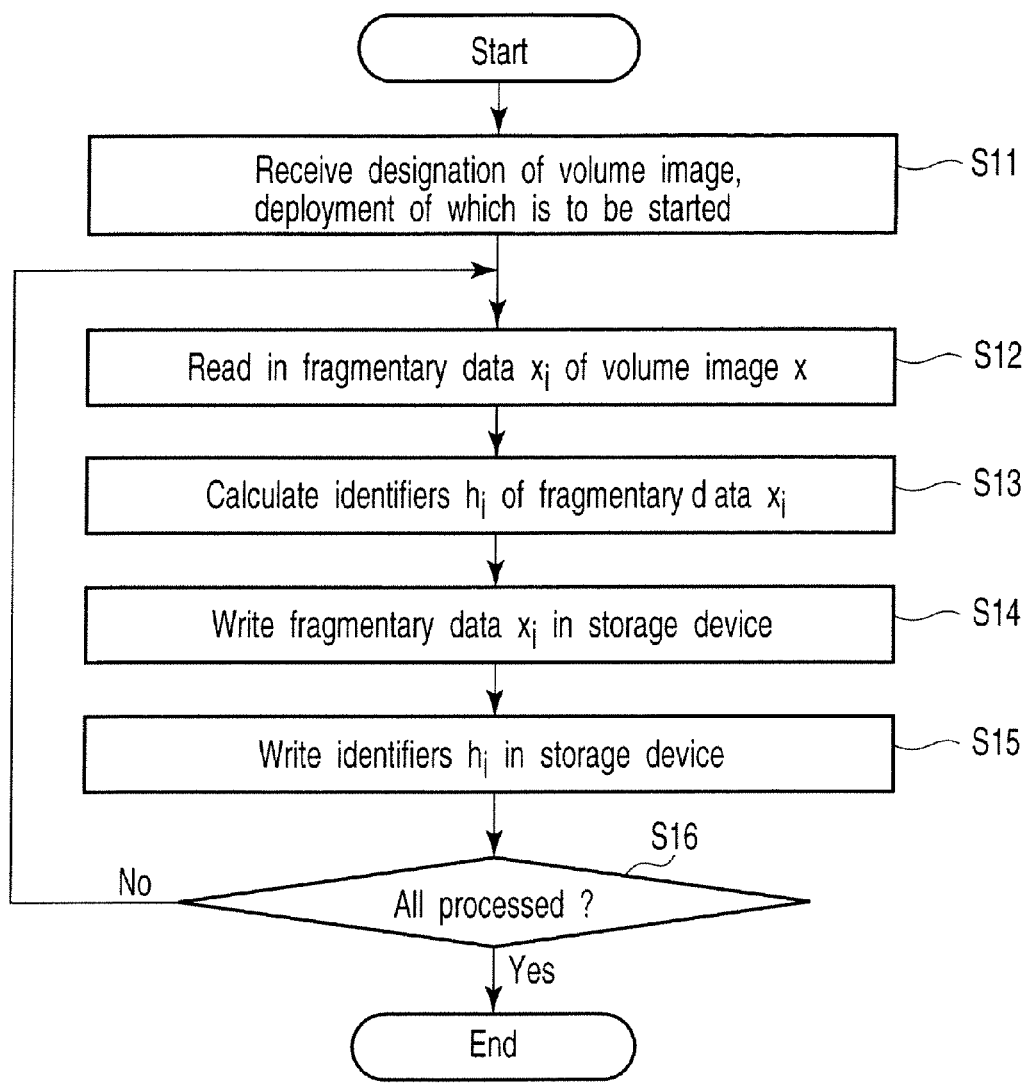
FIG. 4 is a flow chart illustrating a process procedure in which the deployment-source device 30 uploads the volume image, which is stored in the database 22, into the storage device 40.

Next, referring to a flow chart of FIG. 4, a description is given of the process procedure in which the deployment-source device 30 uploads the volume image, which is stored in the database 22, into the storage device 40. The upload process is executed when a volume image that is to be uploaded is designated (input) by, e.g. the administrator. It is now assumed that the volume image that is designated by the administrator is a volume image x.

To start with, the deployment control unit 31 of the deployment-source device 30 receives designation of the volume image x, the deployment of which is to be started (step S11).

It is assumed that the deployment control unit 31 processes the volume image x by dividing the volume image x into an n-number of fragmentary data $x_0, x_1, \ldots, x_{n-1}$. It is also assumed that the fragmentary data $x_i$ (i=0, 1, ..., n−1) has a fixed size of, e.g. a bytes. Specifically, if the size of the volume image x is d, $d = a \bar{\times} n$ (bytes). In the process of steps S12 to S15 to be described below, the process is executed, for example, in the order of fragmentary data $x_0, x_1, \ldots x_i$.

The deployment control unit 31 reads in a fragmentary data $x_i$, which is one of the plural fragmentary data into which the volume image x is divided, from the database 22 via the data access unit 32 (step S12).

Subsequently, the identifier generation unit 33 generates an identifier $h_i$ (i=0, 1, ..., n−1) corresponding to the fragmentary data $x_i$ that is read in by the deployment control unit 31 (step S13). As has been described above, the identifier generation unit 33 generates, for instance, the hash value of the fragmentary data $x_i$ as the identifier corresponding to the fragmentary data $x_i$. In this case, the identifier generation unit 33 generates the hash value by using a hash function such as MD5 or SHA-1.

The deployment control unit 31 transmits the read-in fragmentary data $x_i$ to the storage device 40 via the transfer unit 34. The fragmentary data $x_i$ that is transmitted by the deployment control unit 31 (transfer unit 34) is written in the database 23 via the transfer unit 41 and data access unit 42 of the storage device 40 (step S14).

The deployment control unit 31 transmits the identifier $h_i$, which is generated by the identifier generation unit 33, to the storage device 40 via the transfer unit 34. The identifier $h_i$ that is transmitted by the deployment control unit 31 (transfer unit 34) is written in the database 23 via the transfer unit 41 and data access unit 42 of the storage device 40 (step S15).

The identifier $h_i$ and the fragmentary data $x_i$ corresponding to the identifier $h_i$ are mutually associated and stored in the database 23.

Subsequently, it is determined whether the above-described process of steps S12 to S15 has been executed with respect to all of the n-number of fragmentary data (step S16). If it is determined that the process has been executed with respect to all the fragmentary data (YES in step S16), the upload process is completed.

On the other hand, if it is determined that the process has not been executed with respect to all the fragmentary data (NO in step S16), the process routine returns to step S12, and the process for unprocessed fragmentary data is executed.

Figure 5:
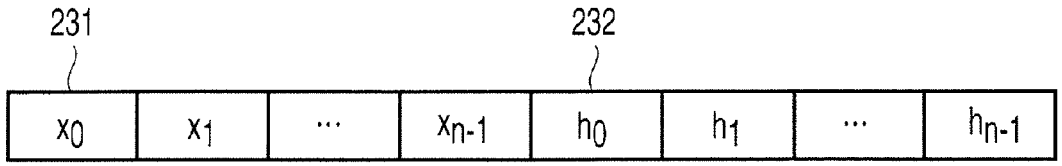
FIG. 5 shows an example of the data structure of a volume image x and an identifier group h, which are stored in the database 23.

FIG. 5 shows an example of the data structure of the volume image x and identifier group h corresponding to the volume image x, which are stored in the database 23 of the storage device 40, when the above-described upload process, for instance, is completed.

As shown in FIG. 5, for example, a plurality of fragmentary data $x_0, x_1, \ldots, x_{n-1}$, into which the volume image x is divided, are successively stored from the first one in the database 23. Subsequently, identifiers $h_0, h_1, \ldots, h_{n-1}$ are successively stored in this order. The plural identifiers $h_0, h_1, \ldots, h_{n-1}$ corresponding to the plural fragmentary data $x_0, x_1, \ldots, x_{n-1}$, into which one volume image x, for instance, is divided, are referred to as "identifier group h".

In the example shown in FIG. 5, the identifier corresponding to the fragmentary data $x_0$ that is stored in an area 231 is the identifier $h_0$ that is stored in an area 232, and the fragmentary data $x_0$ and the identifier $h_0$ are mutually associated. The same applies to the fragmentary data and identifiers other than the fragmentary data $x_0$ and the identifier $h_0$.

Figure 6:
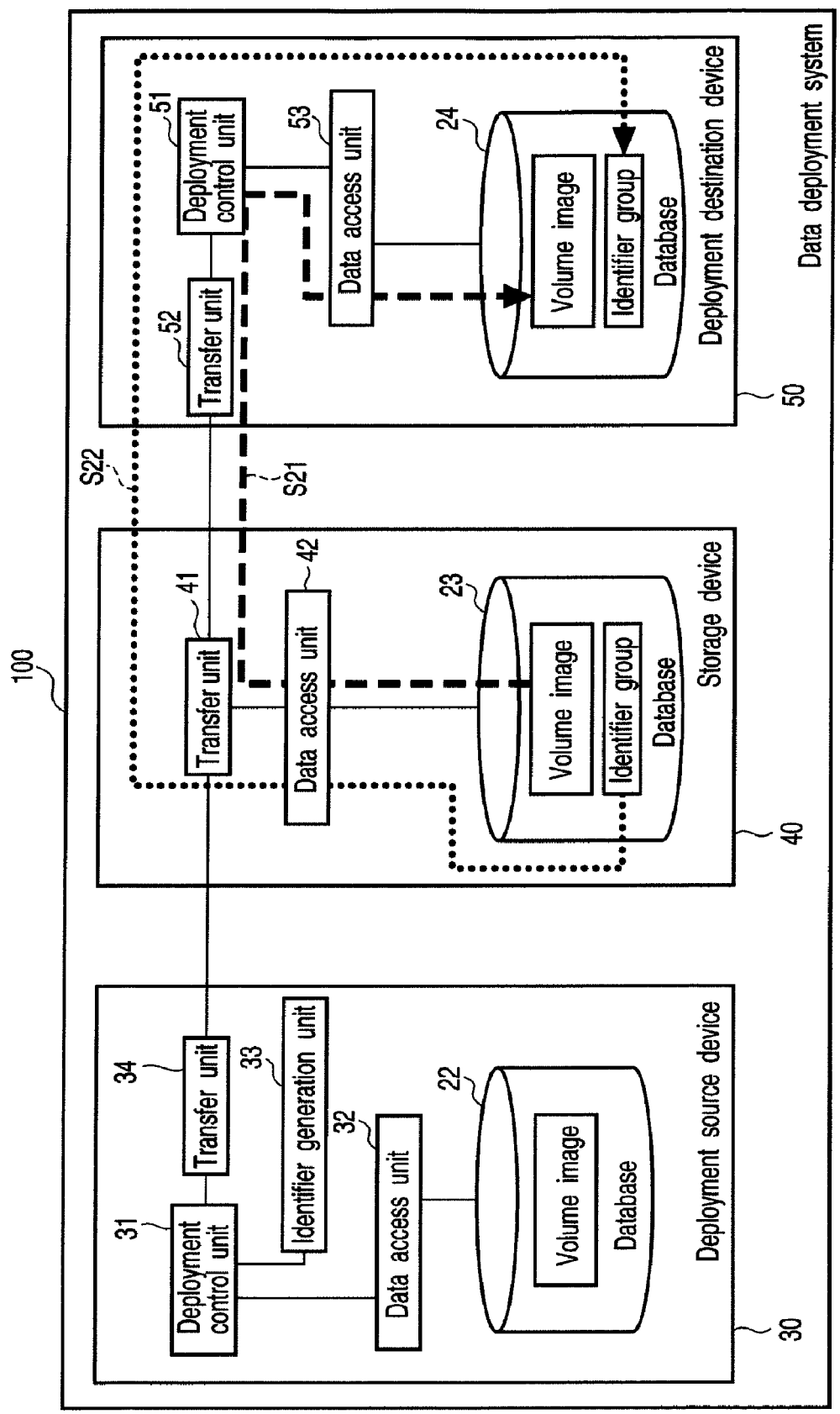
FIG. 6 is a view for explaining an operation in which a deployment-destination device 50 executes a batch-downloading of a volume image from the storage device 40.

Next, referring to FIG. 6, a description is given of an operation in which the deployment-destination device 50 executes a batch-download of a volume image which is stored in the storage device 40 (the database 23 of the storage device 40). For example, in a case where any volume image has not yet been deployed from the deployment-source device 30 to the deployment-destination device 50, the batch-download is executed in order to download a volume image from the deployment-source device 30 to the deployment-destination device 50. In other words, the batch-download is executed, for example, in a case where no volume image is written in the database 24 of the deployment-destination device 50.

It is now assumed that a volume image that is stored in the database 23 of the storage device 40 is a volume image x. It is also assumed that an identifier group corresponding to the volume image x, which is stored in the database 23, is an identifier group h. In addition, it is assumed that a volume image, which is designated for download by, e.g. the administrator, is the volume image x.

In general terms, the batch-download process comprises processes of steps S21 and S22 which are described below. To start with, the deployment-destination device 50 reads in the volume image x (fragmentary data $x_0, x_1, \ldots, x_{n-1}$ into which the volume image x is divided), which is stored in the database 23, via the transfer unit 41 and the data access unit 42 of the storage device 40. In the deployment-destination device 50, the read-in volume image x is written in the database 24 (step S21).

In addition, the deployment-destination device 50 reads in the identifier group h (identifiers $h_0, h_1, \ldots, h_{n-1}$), which is stored in the database 23, via the transfer unit 41 and the data access unit 42 of the storage device 40. In the deployment-destination device 50, the read-in identifier group h is written in the database 24 (step S22).

The fragmentary data $x_0, x_1, \ldots, x_{n-1}$, into which the volume image x is divided, and the identifiers $h_0, h_1, \ldots, h_{n-1}$, which are read out from the storage device 40, are mutually associated and stored in the database 24.

When the volume image x, which is designated for download, and the identifier group h have been written in the database 24 of the deployment destination device 50, the batch-download process is completed.

During the batch-download process, it is necessary to prevent the data from being written in the area of the database 24 of the deployment destination device 50, to which the volume image (the volume image x in this example) that is designated for batch-download is to be downloaded. Thus, like the above-described upload process, the download process is executed, for example, in the following environment:

1) Boot is not executed from the designated volume image (volume image x) itself (boot is executed from another boot image), and 2) Writing of data is blocked by the driver level (filter driver) in a case where boot is executed from the volume image (volume image x) itself.

If an upload process, for instance, is executed during the above-described batch-download process, a volume image in a damaged state would be downloaded. To avoid this problem, it is necessary to properly protect the volume image, for example, by placing priority on either of the upload process or download process.

Figure 7:
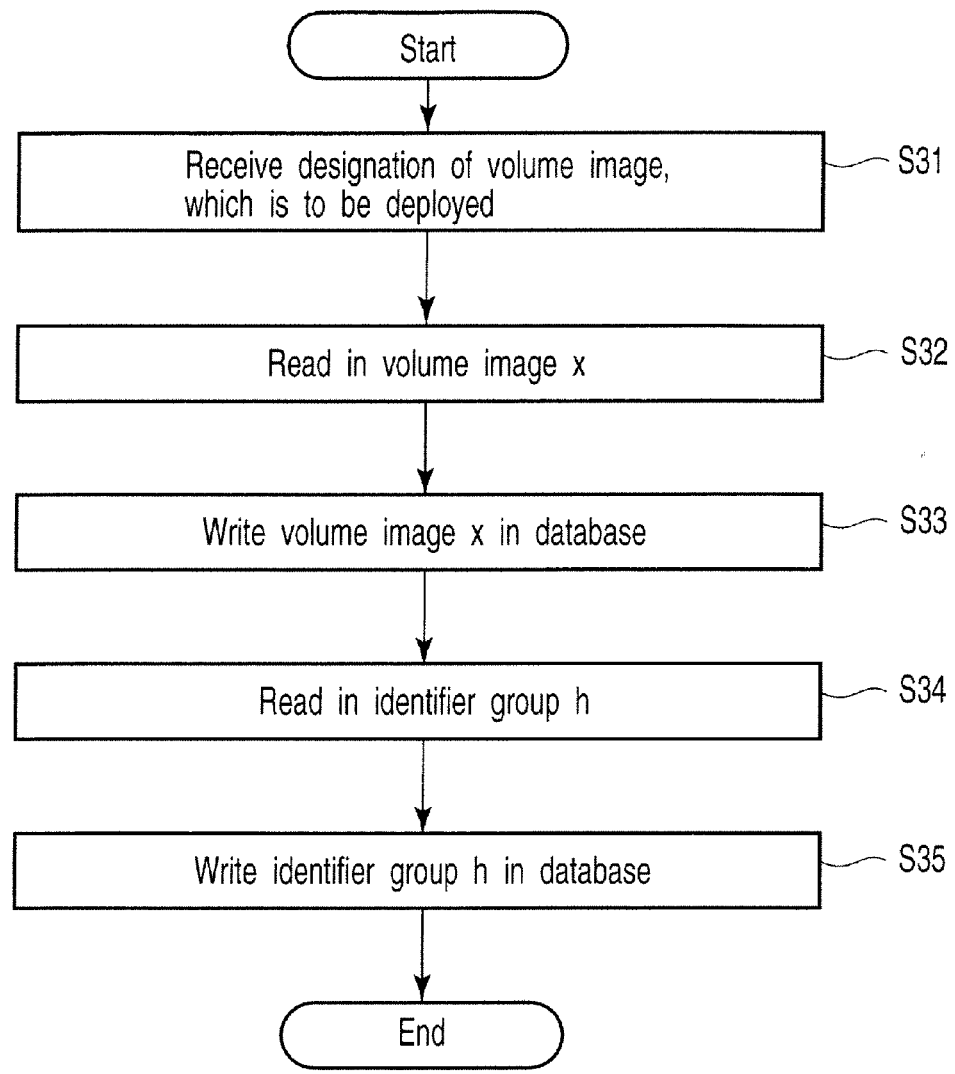
FIG. 7 is a flow chart illustrating a process procedure in which the deployment-destination device 50 executes a batch-downloading of a volume image from the storage device 40.

Next, referring to a flow chart of FIG. 7, a description is given of the process procedure in which the deployment-destination device 50 executes batch-download of the volume image that is stored in the database 23 of the storage device 40.

The batch-download process is executed when a volume that is to be downloaded is designated (input) by, e.g. the administrator. It is now assumed that the volume image that is designated by the administrator is the volume image x that is stored in the database 23 of the storage device 40. It is also assumed that the identifier group, which is stored in the database 23 in association with the volume image x, is the identifier group h.

To start with, the deployment control unit 51 of the deployment-destination device 50 receives designation of the volume image x, which is to be deployed (step S31).

The deployment control unit 51 sends a deployment request, which requests deployment of, e.g. the designated volume image x, to the storage device 40 via the transfer unit 52. Responding to the deployment request that is sent from the deployment-destination device 50 (deployment control unit 51), the transfer unit 41 of the storage device 40 reads in the volume image x that is stored in the database 23. At this time, the transfer unit 41 reads in the volume image x via the data access unit 42. The transfer unit 41 transmits the read-in volume image x to the deployment-destination device 50.

The deployment control unit 51 of the deployment-destination device 50 reads in the volume image x which is transmitted by the transfer unit 41 of the storage device 40 (step S32).

The deployment control unit 51 writes the read-in volume image x in the database 24 via the data access unit 53 (step S33).

In addition, responding to the deployment request that is sent from the deployment-destination device 50, the transfer unit 41 of the storage device 40 reads in the identifier group h that is stored in the database 23. The transfer unit 41 reads in the identifier group h via the data access unit 42. The transfer unit 41 transmits the read-in identifier group h to the deployment-destination device 50. The identifier group h is identifiers $h_0, h_1, \ldots, h_{n-1}$ corresponding to the fragmentary data $x_0, x_1, \ldots, x_{n-1}$, into which the volume image x is divided.

The deployment control unit 51 of the deployment-destination device 50 reads in the identifier group h which is transmitted by the transfer unit 41 of the storage device 40 (step S34).

The deployment control unit 51 writes the read-in identifier group h in the database 24 via the data access unit 53 (step S35). The read-in identifier group h is associated with the volume image x (fragmentary data $x_0, x_1, \ldots, x_{n-1}$ into which the volume image x is divided) and written in the database 24.

Next, referring to FIG. 8, a description is given of an operation in which the deployment-destination device 50 executes differential download of a volume image which is stored in the storage device 40 (the database 23 of the storage device 40). For example, in a case where a volume image is already deployed to the deployment-destination device 50 and the volume image has been updated in, e.g. the deployment-source device 30, the differential download is executed in order to download the updated volume image from the deployment-destination device 50 to the deployment-source device 30.

It is now assumed that a volume image that is stored in the database 24 of the deployment-destination device 50 is a volume image x, and an identifier group corresponding to the volume image x, which is stored in the database 24, is an identifier group h. It is also assumed that a volume image, which is stored in the database 23 of the storage device 40 is a volume image x', and an identifier group corresponding to the volume image x', which is stored in the database 23, is an identifier group h'. In addition, it is assumed that a volume image, which is designated for download by, e.g. the administrator, is the volume image x'.

Figure 9:
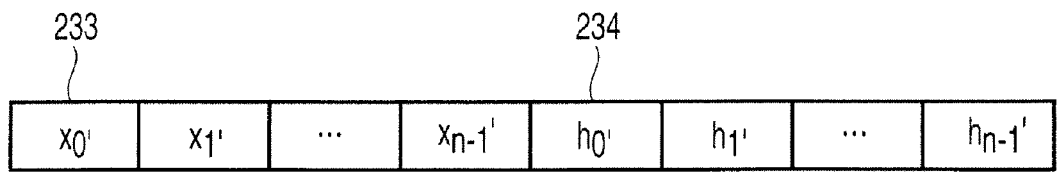
FIG. 9 shows an example of a data structure of volume images x' and an identifier group h', which are stored in the database 23.

FIG. 9 shows an example of the data structure of the volume image x' and identifier group h', which are stored in the database 23 of the storage device 40. The volume image x' is, for instance, an updated volume image of the volume image x, and comprises an n-number of fragmentary data $x_0', x_1', \ldots,$ $x_{n-1}'$. The identifier group h' is an identifier group corresponding to the volume image x', and comprises identifiers $h_0'$, $h_1'$, . . . , $h_{n-1}'$.

As shown in FIG. 9, for example, a plurality of fragmentary data $x_0'$, $x_1'$, . . . , $x_{n-1}'$, into which the volume image x' is divided, are successively stored from the first one in the database 23. Subsequently, identifiers $h_0'$, $h_1'$, . . . , $h_{n-1}'$ are successively stored.

In the example shown in FIG. 9, the identifier, which is generated by using the fragmentary data $x_0'$ that is stored in an area 233, is the identifier $h_0'$ that is stored in an area 234, and the fragmentary data $x_0'$ and the identifier $h_0'$ are mutually associated. The same applies to the fragmentary data and identifiers other than the fragmentary data $x_0'$ and the identifier $h_0'$.

On the other hand, as described above, it is assumed that the identifier group corresponding to the volume image x is the identifier group h, and the data structure of the volume image x and the identifier group h corresponding to the volume image x is the same as shown in FIG. 5.

As shown in FIG. 5 and FIG. 9, the data structure of the volume image x', which is the updated volume image of the volume image x, and the data structure of the identifier group h' correspond to the data structures of the volume image x and identifier group h. In the example shown in FIG. 5 and FIG. 9, the fragmentary data $x_0$ stored in the area 231 in FIG. 5 corresponds to the fragmentary data $x_0'$ stored in the area 233 in FIG. 9. In addition, the identifier $h_0$ stored in the area 232 in FIG. 5 corresponds to the identifier $h_0'$ stored in the area 234 in FIG. 9. The same applies to the other fragmentary data and identifiers.

As has been described above, since the volume image before update and the volume image after update have the same structure, updated fragmentary data (differential data) can be detected by comparison of the identifiers.

The above-described data structures are set (defined) in advance in the deployment-source device 30, storage device 40 and deployment-destination device 50. The deployment-source device 30, storage device 40 and deployment-destination device 50 may have such data structures that the fragmentary data, into which the volume image is divided, and the identifiers corresponding to the fragmentary data are alternately arranged. In the case where the data structures are not set in advance in the deployment-source device 30, storage device 40 and deployment-destination device 50, the data for setting the data structure may be added to the volume image and the identifier group.

Referring back to FIG. 8, the differential download process comprises processes of steps S41 to S44 which are described below. To start with, the deployment control unit 51 of the deployment-destination device 50 reads in the identifiers h' ($h_0'$, $h_1'$, . . . , $h_{n-1}'$) corresponding to the designated volume image x' via the transfer unit 41 and data access unit 42 of the storage device 40 (step S41).

Subsequently, the deployment control unit 51 reads in the identifier group h, which corresponds to the volume image x stored in the database 24 (i.e. the volume image that is currently used in the deployment-destination device 50), from the database 24 (step S42). The deployment control unit 51 compares the associated identifiers of the read-in identifier group h and identifier group h' to find one or some identifiers in the identifier group h' which differ from the associated one or some identifiers in the identifier group h.

The deployment control unit 51 reads in fragmentary data, which corresponds to the found identifier or identifiers in the identifier group h', from the database 23 via the transfer unit 41 and data access unit 42 of the storage device 40. The deployment control unit 51 overwrites the read-in fragmentary data in the database 24 via the data access unit 53 (step S43).

In addition, the deployment control unit 51 overwrites the found identifier or identifiers in the identifier group h' on the corresponding identifier or identifiers in the identifier group h stored in the database 24 (step S44).

Figure 10:
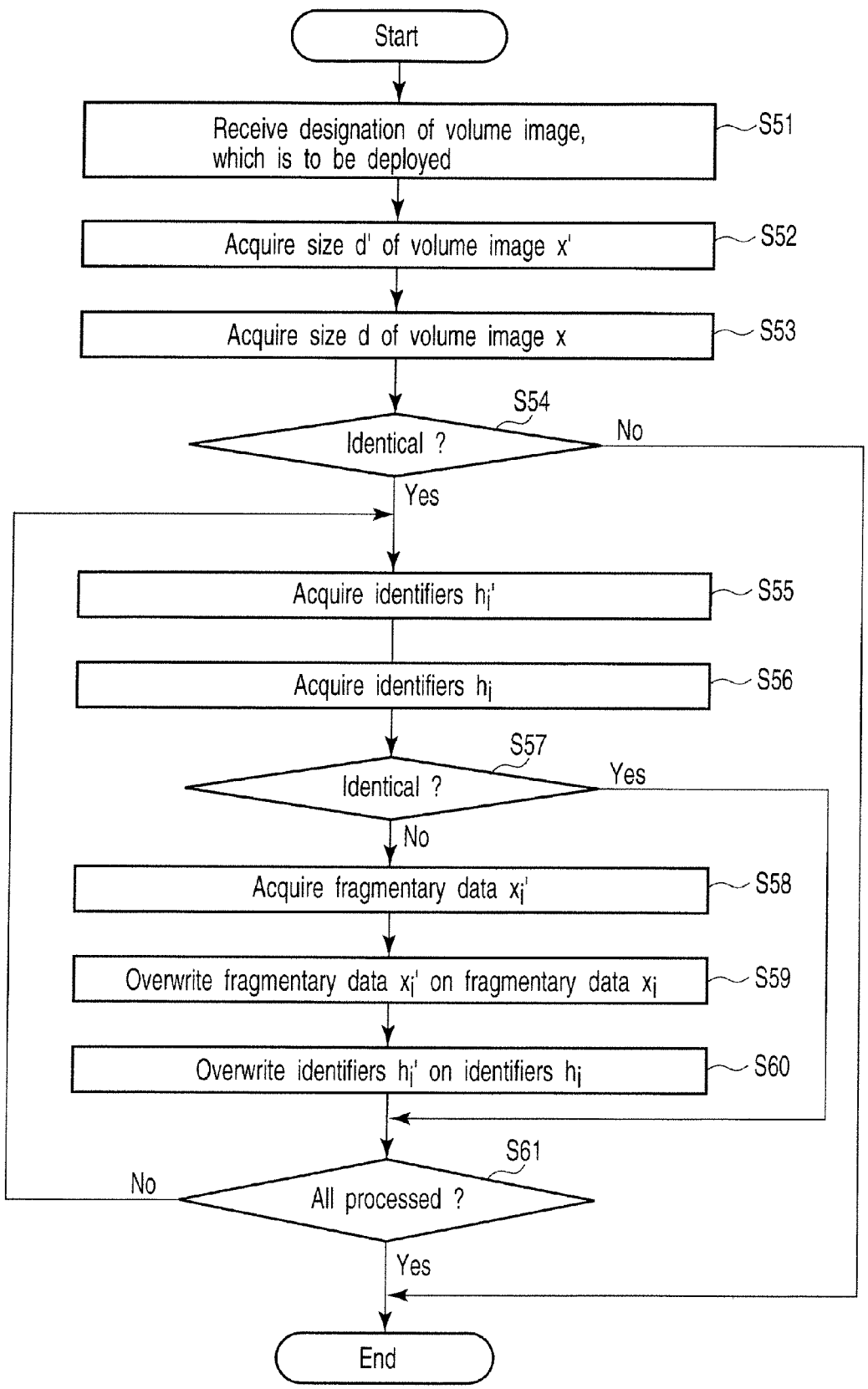
FIG. 10 is a flow chart illustrating a process procedure in which the deployment-destination device 50 executes differential downloading of a volume image from the storage device 40.

Next, referring to a flow chart of FIG. 10, a description is given of a process procedure in which the deployment-destination device 50 executes differential download of a volume image which is stored in the database 23 of the storage device 40.

As has been described with reference to FIG. 8, it is assumed that the volume image x and identifier group h are stored in the database 24 of the deployment-destination device 50 and that the volume image x' and identifier group h' are stored in the database 23 of the storage device 40. It is assumed that the volume image x' is an updated volume image of the volume image x. The volume image x' and identifier group h', which are stored in the database 23 of the storage device 40, are the volume image and identifier group which are uploaded from the deployment-source device 30 to the storage device 40, for example, when the volume image x in the deployment-source device 30 is updated to the volume image x', as in the process illustrated in FIG. 4.

The differential download process is executed if a volume image, which is to be downloaded, is designated (input) by, e.g. the administrator. In the description below, it is assumed that the volume image, which is designated by, e.g. the administrator, is the volume image x'.

To start with, the deployment control unit 51 of the deployment-destination device 50 receives designation of the volume image x', which is to be deployed (step S51).

The deployment control unit 51 acquires from the storage device 40 the data size d' of the volume image x' via the transfer unit 41 and data access unit 42 of the storage device 40 (step S52).

The deployment control unit 51 acquires the data size d of the volume image x (the previously deployed volume image) which is stored in the database 24 (step S53).

The deployment control unit 51 determines whether the acquired data sizes d and d' are identical or not (step S54). By this process, it is determined whether the volume image x' to be deployed is an updated volume image of the volume image x that is stored in the database 24. In short, if the data sizes are different, a designation error, for instance, of the volume image that is the object of deployment can be detected.

If it is determined that the acquired data sizes d and d' are identical (YES in step S54), the deployment control unit 51 acquires the identifiers $h_i'$ (i=0, 1, . . . , n−1), which are stored in the database 23, via the transfer unit 41 and data access unit 42 of the storage device 40 (step S55).

The deployment control unit 51 acquires the identifiers $h_i$ (i=0, 1, . . . , n−1), which are stored in the database 24 (step S56).

The deployment control unit 51 determines whether the acquired identifiers $h_i$ and $h_i'$ are identical (or different) (step S57).

If it is determined that the acquired identifiers $h_i$ and $h_i'$ are different (NO in step S57), the deployment control unit 51 acquires the fragmentary data $x_i'$ corresponding to the identifier $h_i'$, which is stored in the database 23 of the storage device 40 (step S58). At this time, the deployment control unit 51 acquires the fragmentary data $x_i'$ via the transfer unit 41 and data access unit 42 of the storage device 40. The acquired fragmentary data $x_i'$ is differential data which is indicative of an updated part of the volume image x'.

The deployment control unit 51 overwrites the acquired fragmentary data $x_i'$ (differential data) on the fragmentary data $x_i$ via the data access unit 53 (step S59).

The deployment control unit 51 overwrites the acquired identifier $h_i'$ on the identifier $h_i$ via the data access unit 53 (step S60).

Subsequently, it is determined whether the process of steps S55 to S60 has been executed for all identifiers in the identifier group h ($h_0$, $h_1$, ..., $h_{n-1}$) and identifier group h' ($h_0'$, $h_1'$, ..., $h_{n-1}'$) (step S61).

If it is determined that the process has been executed for all identifiers in the identifier group h and identifier group h' (YES in step S61), the differential download process is completed.

On the other hand, if it is determined that the process has not been executed for all identifiers in the identifier group h and identifier group h' (NO in step S61), the control routine returns to step S55 and the process is executed with respect to the non-processed identifier.

If it is determined in step S54 that the acquired data sizes d and d' are not identical, a designation error, for instance, of the volume image that is the object of deployment is detected and the differential download process is not executed. In this case, a report that the differential download is not executed is issued (output) to, e.g. the administrator.

If it is determined in step S57 that the identifiers $h_i$ and $h_i'$ are identical, the process of step S61 is executed.

In step S57, if the identifiers $h_i$ and $h_i'$ are not identical, it is determined that the fragmentary data $x_i$ corresponding to the identifier $h_i$ has been updated to the fragmentary data $x_i'$ (i.e. differential data) corresponding to the identifier $h_i'$. On the other hand, if the identifiers $h_i$ and $h_i'$ are identical, it is determined that the fragmentary data $x_i$ corresponding to the identifier $h_i$ has not been updated. In other words, it is determined that the contents of the fragmentary data $x_i$ corresponding to the identifier $h_i$ and the fragmentary data $x_i'$ corresponding to the identifier $h_i'$ have not been changed (i.e. not updated).

As has been described above, in the present embodiment, the identifier group h that is generated in the deployment-source device 30 is stored in the deployment-destination device 50. In the case where the volume image in the deployment-source device 30 is updated, the identifier group h stored in the deployment-destination device 50 is compared with the identifier group h' which is newly generated in the deployment-source device 30. Thereby, solely the differential data, which is the updated part of the volume image, can be deployed. Therefore, the amount of data, which is transmitted (transferred) when the updated volume image is deployed, can be reduced, and the speed of the deployment process can be increased.

In the present embodiment, for example, there is no need to manage a differential map, or to newly generate identifiers in the deployment-destination device 50 in order to compare identifiers.

In this embodiment, by virtue of the structure in which hash values are used as identifiers, there is no need to memorize (store) all deployed data patterns in order to generate, e.g. individual identifiers.

In the present embodiment, by virtue of the structure in which the storage device 40 is provided, the deployment-source device 30 can execute upload to the storage device 40 in advance, without generating identifiers, for example, at the time of deploying the volume image. Thereby, independent deployment processes can be executed in the deployment-source device 30 and deployment-destination device 50.

In this embodiment, the deployment process of the volume image has been described. The embodiment, however, is also applicable to the deployment process of data such as files.

The present embodiment has been described on the assumption that the storage device 40 is provided. In the structure of this embodiment, however, the storage device 40 need not be provided. In this case, the deployment-source device 30 directly transmits the volume image and identifiers to the deployment-destination device 50 without uploading them in the storage device 40. Further, the embodiment may have a structure in which identifiers are generated in advance in the deployment-source device 30 and stored in the database 22.

[First Modification]

Figure 11:
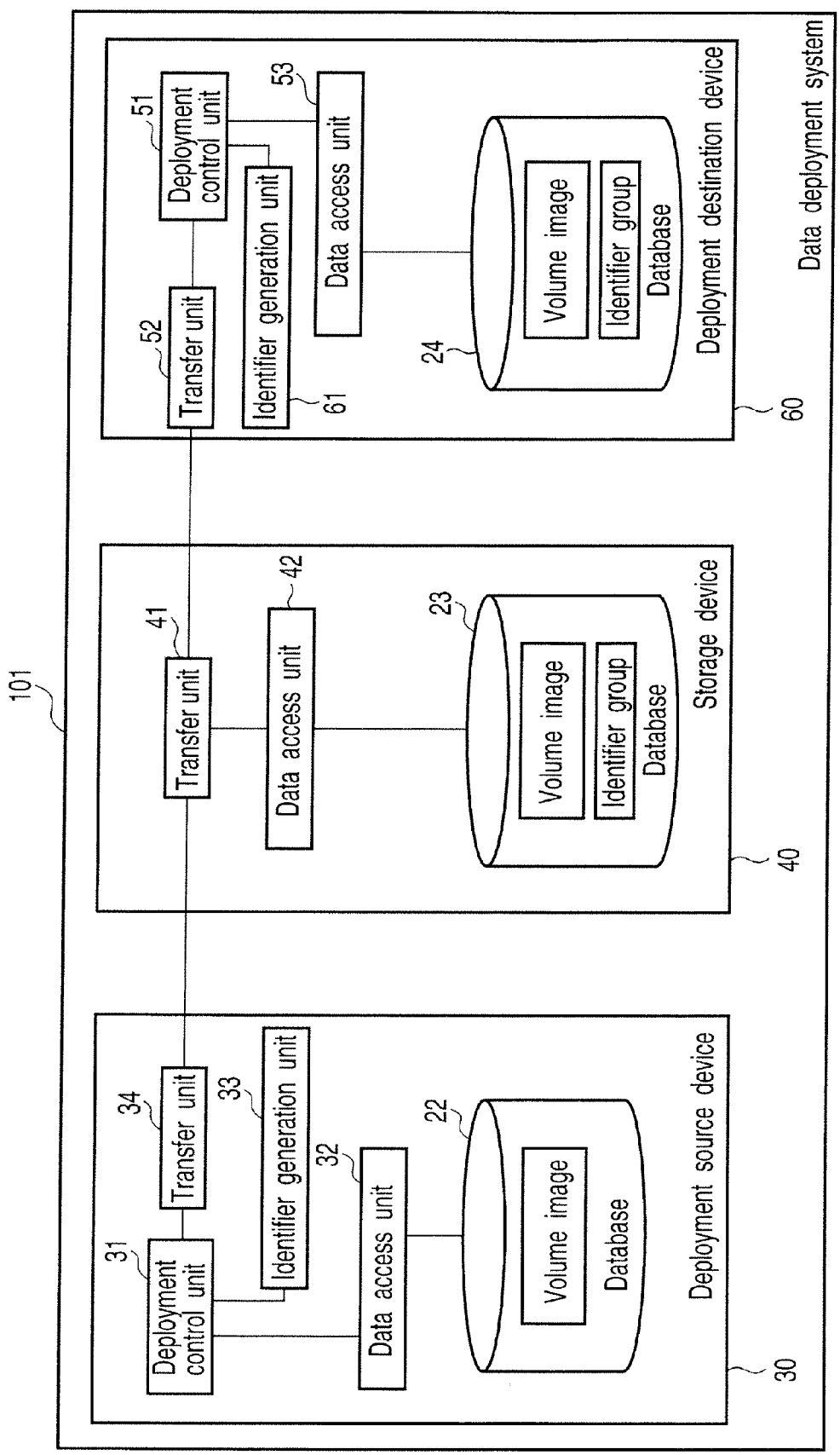
FIG. 11 is a block diagram which mainly shows a functional configuration of a data deployment system according to a first modification of the embodiment.

Next, referring to FIG. 11, a first modification of the present embodiment is described. FIG. 11 is a block diagram which mainly shows the functional configuration of a data deployment system 101 according to the first modification. The parts common to those in FIG. 2 are denoted by like reference numerals, and a detailed description thereof is omitted. Parts that are different from the structure shown in FIG. 2 are mainly described here. As regards the modification, too, an overlapping description is omitted.

The data deployment system 101 according to the present modification includes a deployment-destination device 60. The deployment-destination device 60 differs from the deployment-destination device 50 of the above-described embodiment in that the deployment-destination device 60 includes an identifier generation unit 61. The hardware configuration of the deployment-destination device 60 is the same as that of the deployment-destination device 50, and it is assumed that the identifier generation unit 61 is realized by the execution of the program 21, which is stored in the external storage device 20, by the above-described computer 10 shown in FIG. 1.

In the present modification, for example, in a case where data (a new volume image) is written in the area of the database 24 in which a volume image is stored, the deployment control unit 51 of the deployment-destination device 60 invalidates the identifier group (all identifiers) corresponding to the volume image.

For example, in a case where the identifier group corresponding to the volume image, which is stored in the database 24 of the deployment-destination device 60, is invalidated, the identifier generation unit 61 reads in a plurality of fragmentary data, into which the new volume image is divided, and generates identifiers (identifier group) corresponding to the individual fragmentary data. The identifier generation unit 61 generates, as the identifiers corresponding to the fragmentary data, hash values of the fragmentary data by using a hash function such as MD5 or SHA-1.

The deployment control unit 51 of the deployment-destination device 60 may have such a structure that in a case where a new volume image, for instance, is written in the area of the database 24 in which a volume image is stored, the deployment control unit 51 invalidates only the identifier (identifier unit) corresponding to the fragmentary data (i.e. fragmentary data of a range including written data) of the volume image in which the data is written.

Next, referring to a flow chart of FIG. 12, a description is given of a process procedure of differential download, for example, in a case where the identifier group corresponding to the volume image stored in the database 24 is invalidated.

As has been described with reference to FIG. 10, it is assumed that the volume image x and identifier group h are stored in the database 24 of the deployment-destination device 60 and that the volume image x' and identifier group h' are stored in the database 23 of the storage device 40. It is also assumed that the volume image, which is designated by, e.g. the administrator is the volume image x'.

To start with, a process of step S71, which corresponds to step S51 shown in FIG. 10, is executed.

Then, the deployment control unit 51 determines whether the identifier group h, which is stored in the database 24, is invalidated (step S72).

If it is determined that the identifier group h is invalidated (YES in step S72), the deployment control unit 51 reads out the fragmentary data $x_0, x_1, \ldots, x_{n-1}$, into which the volume image x stored in the database 24 is divided, via the data access unit 53.

The identifier generation unit 61 generates identifiers (i.e. identifier group h) corresponding to the fragmentary data $x_0, x_1, \ldots, x_{n-1}$, which are read out by the deployment control unit 51 (step S73).

Subsequently, the process of steps S74 to S83, which corresponds to the process of steps S52 to S61 shown in FIG. 10, is executed.

On the other hand, if it is determined in step S72 that the identifier group h is not invalidated, the process of steps S74 to S83, which corresponds to the process of steps S52 to S61 shown in FIG. 10, is executed.

In other words, in the case where the identifier group h is invalidated by writing of data, the identifier group h corresponding to the volume image x, in which data is written, is newly generated by the identifier generation unit 61, and the differential download process is executed on the basis of the identifier group h. Thereby, even in the case where data is written in the deployment-destination device 50, the download process of differential data can be executed.

Figure 13:
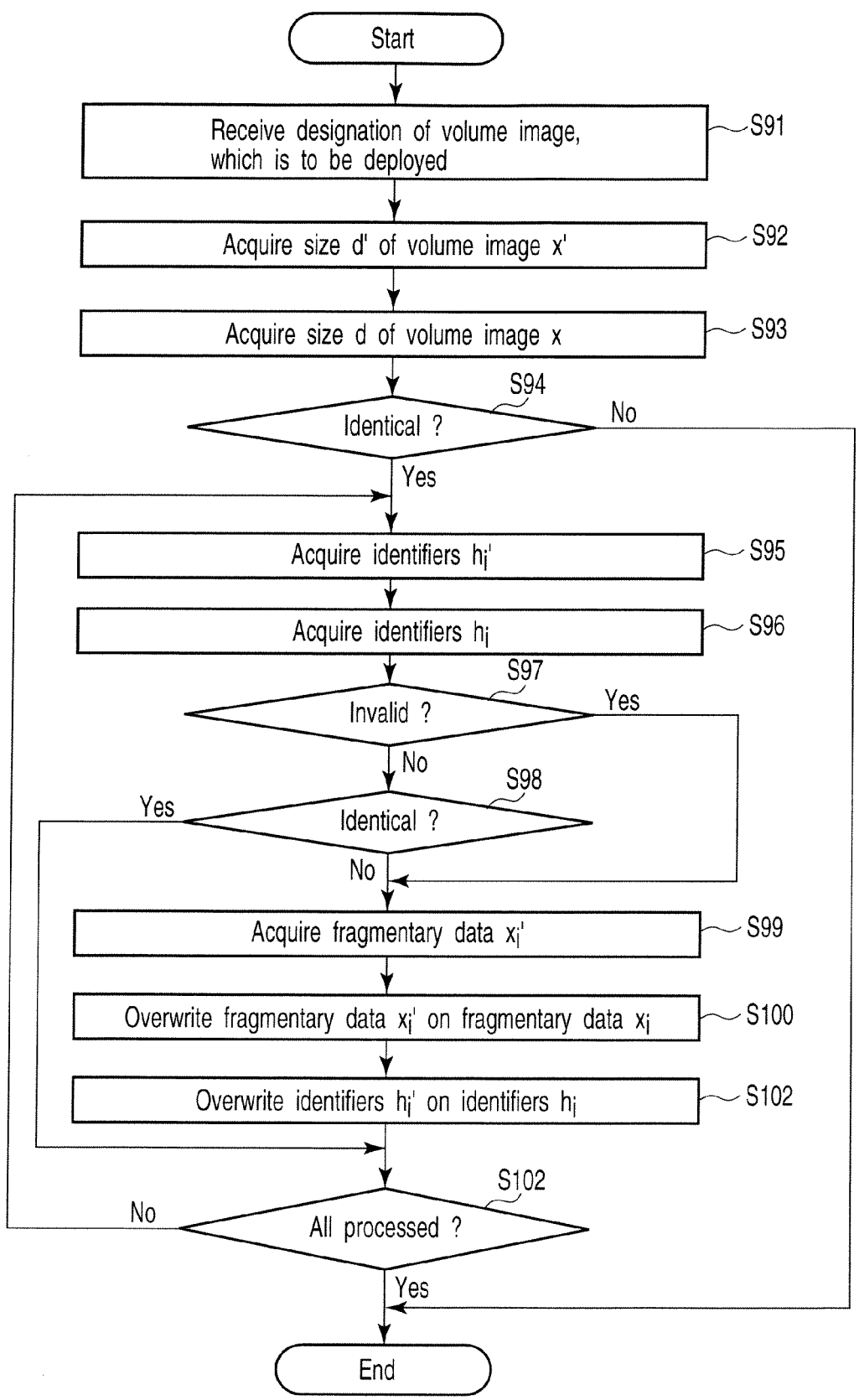
FIG. 13 is a flow chart illustrating a process procedure of differential downloading which is executed after invalidation of an identifier corresponding to fragmentary data in which data is written in a volume image.

Next, referring to a flow chart of FIG. 13, a description is given of the process procedure of differential download, which is executed after invalidation of only an identifier corresponding to fragmentary data in which data is written in a volume image.

As has been described with reference to FIG. 10, it is assumed that the volume image x and identifier group h are stored in the database 24 of the deployment-destination device 60 and that the volume image x' and identifier group h' are stored in the database 23 of the storage device 40. It is also assumed that the volume image, which is designated by, e.g. the administrator, is the volume image x'.

To start with, the process of steps S91 to S96, which corresponds to the process of steps S51 to S56 shown in FIG. 10, is executed.

Subsequently, the deployment control unit 51 determines whether the identifiers $h_i$, which are acquired in the process of step S96, are invalidated (step S97).

If the deployment control unit 51 determines that the identifiers $h_i$ are invalidated (YES in step S97), the process of steps S99 to S102, which corresponds to the process of steps S58 to S61 shown in FIG. 10, is executed.

On the other hand, if the deployment control unit 51 determines that the identifiers $h_i$ are not invalidated (NO in step S97), the process of steps S98 to S102, which corresponds to the process of steps S57 to S61 shown in FIG. 10, is executed.

Specifically, in the case where the identifiers $h_i$ are invalidated by writing of data, the fragmentary data $x_i'$ corresponding to the identifiers $h_i'$ and the identifiers $h_i'$ are overwritten, without condition, in the database 24 without comparing the identifiers $h_i$ and the identifiers $h_i'$. Thereby, even when data is written in the deployment-destination device 50, the download process of differential data can be executed.

As has been described above, in the present modification, in the case where data is written in the volume image in the deployment-destination device 60, the identifier group corresponding to this volume image is invalidated. Thereby, even when data is written in the deployment-destination device 60, the differential data can be deployed.

In the meantime, in the present modification, the differential data can be deployed even with such a structure that only an identifier corresponding to fragmentary data, in which data is written in a volume image, is invalidated.

[Second Modification]

Next, a second modification of the embodiment is described. The functional configuration of a data deployment system according to the second modification is the same as that of the first modification, and is described with reference to FIG. 11.

In the second modification, the identifier generation unit 61 generates the identifiers of the fragmentary data of the volume image, in which data is written, for example, when the data (a new volume image) is written in the area of the database 24 of the deployment-destination device 60, in which the volume image is stored. The identifier, which is generated by the identifier generation unit 61, is overwritten in the database 24 in association with the fragmentary data in which data is written.

In other words, in the present modification, the identifier corresponding to the fragmentary data, in which data is written, is updated at the same time the data is written in the volume image (i.e. the volume image has been updated) which is stored in the database 24 of the deployment-destination device 60.

As has been described above, in the present modification, when data is written in the volume image in the deployment-destination device 60, the identifier corresponding to the fragmentary data, in which the data is written, is updated. Thereby, even if data is written in the deployment-destination device 60, the differential data can be deployed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data deployment system comprising:
   a deployment-source device including a first database which stores first data; and
   a deployment-destination device to which the first data stored in the first database is deployed, wherein
   the deployment-source device includes:
   a first generation unit which generates first identifiers corresponding to a plurality of first fragmentary data, into which the first data stored in the first database is divided; and
   a second generation unit which generates, when the first data is updated to second data, second identifiers corresponding to a plurality of second fragmentary data, into which the second data is divided, and
   the deployment-destination device includes:
   a second database which stores the first data that is stored in the first database and the first identifiers that are generated by the first generation unit;
   a determination unit which determines whether the first identifiers stored in the second database are identical to the second identifiers which correspond to the first identifiers and are generated by the second generation unit; and a write unit which writes in the second database the second fragmentary data corresponding to the second identifiers and the second identifiers when the determination unit determines that the first identifiers are not identical to the second identifiers which correspond to the first identifiers.

2. The data deployment system according to claim 1, wherein
the first generation unit generates hash values of the plurality of first fragmentary data as the first identifiers corresponding to the plurality of first fragmentary data, and
the second generation unit generates hash values of the plurality of second fragmentary data as the second identifiers corresponding to the plurality of second fragmentary data.

3. The data deployment system according to claim 1, further comprising:
a third database which is provided separately from the deployment-source device and the deployment-destination device and stores the first data and the first identifiers corresponding to the plurality of first fragmentary data into which the first data is divided, and the second data and the second identifiers corresponding to the plurality of second fragmentary data into which the second data is divided,
wherein the deployment-destination device further includes:
an acquisition unit which acquires from the third database the first identifiers, the second identifiers, the first data, and the second fragmentary data into which the second data is divided, and
wherein the second database stores the first data and the first identifiers, which are acquired by the acquisition unit,
the determination unit determines whether the first identifiers which are stored in the second database are identical to the second identifiers which are acquired by the acquisition unit and correspond to the first identifiers, and
the write unit writes the second fragmentary data corresponding to the second identifiers and the second identifiers, which are acquired by the acquisition unit, in the second database.

4. The data deployment system according to claim 1, wherein the first data is a first volume image, and the second data is a second volume image,
the first fragmentary data are set at predetermined logical block address intervals of the first volume image, and
the second fragmentary data are set at the predetermined logical block address intervals of the second volume image.

5. The data deployment system according to claim 1, wherein the deployment-destination device further includes:
an invalidation unit which invalidates the first identifiers corresponding to the plurality of first fragmentary data into which the first data is divided, when write of new first data has occurred in an area of the second database in which the first data is stored; and
a third generation unit which generates, when the first identifiers are invalidated by the invalidation unit, first identifiers corresponding to a plurality of first fragmentary data into which the new first data is divided.

6. The data deployment system according to claim 1, wherein the deployment-destination device further includes:
a third generation unit which generates, when write of new first data has occurred in an area of the second database in which the first data is stored, first identifiers corresponding to the new first data, and
wherein the write unit writes in the second database the first identifiers which are generated by the third generation unit.

7. The data deployment system according to claim 3, wherein the deployment-source device further includes:
an upload process unit which executes an upload process of writing in the third database the first data and the first identifiers corresponding to the plurality of first fragmentary data into which the first data is divided; and
a suppression unit which suppresses write in an area in which the first data, which is being subjected to the upload process by the upload process unit, is stored.

8. The data deployment system according to claim 3, wherein the deployment-destination device further includes:
a download process unit which executes a download process of writing in the second database the first data and the first identifiers, which are acquired by the acquisition unit; and
a suppression unit which suppresses write in an area in which the first data, which is being subjected to the download process by the download process unit, is stored.

9. A computer readable storage medium which stores a program code, which is executed by a computer of a data deployment system including a deployment-source device including a first database which stores first data, and a deployment-destination device to which the first data stored in the first database is deployed and which includes a second database, the program code comprising:
generating first identifiers corresponding to a plurality of first fragmentary data, into which the first data stored in the first database is divided;
storing in the second database the first data stored in the first database and the first identifiers that are generated;
generating, when the first data is updated to second data, second identifiers corresponding to a plurality of second fragmentary data, into which the second data is divided;
determining whether the first identifiers stored in the second database are identical to the generated second identifiers which correspond to the first identifiers; and
writing in the second database the second fragmentary data corresponding to the second identifiers and the second identifiers when it is determined that the first identifiers are not identical to the second identifiers which correspond to the first identifiers.

* * * * *